(12) United States Patent
Gadat et al.

(10) Patent No.: US 9,131,393 B2
(45) Date of Patent: Sep. 8, 2015

(54) METHOD FOR OPTIMIZING THE RESOURCES OF A DATA TRANSMISSION AT THE LEVEL OF THE MAC LAYER AND DEVICE IMPLEMENTING THE METHOD

(71) Applicant: THALES, Neuilly-sur-Seine (FR)

(72) Inventors: Benjamin Gadat, Toulouse (FR);
Nicolas Van Wambeke, Toulouse (FR);
Mathieu Gineste, Toulouse (FR)

(73) Assignee: Thales, Courbevoie (FR)

( * ) Notice: Subject to any disclaimer, the term of this patent is extended or adjusted under 35 U.S.C. 154(b) by 131 days.

(21) Appl. No.: 13/970,395

(22) Filed: Aug. 19, 2013

(65) Prior Publication Data
US 2014/0064097 A1 Mar. 6, 2014

(30) Foreign Application Priority Data
Aug. 31, 2012 (FR) ...................................... 12 02339

(51) Int. Cl.
*H04L 1/00* (2006.01)
*H04W 24/02* (2009.01)

(52) U.S. Cl.
CPC ............. *H04W 24/02* (2013.01); *H04L 1/0003* (2013.01); *H04L 1/0009* (2013.01); *H04L 1/0065* (2013.01); *H04L 1/0071* (2013.01)

(58) Field of Classification Search
CPC ......... H04L 47/10; H04L 47/11; H04L 47/12; H04L 47/13; H04L 47/14; H04J 3/14; H04J 3/15; H04J 3/16; H04J 3/17; H04J 3/18
USPC ........................... 370/236, 230, 229, 235, 242
See application file for complete search history.

(56) References Cited

U.S. PATENT DOCUMENTS

| | | | | |
|---|---|---|---|---|
| 6,075,821 A | * | 6/2000 | Kao et al. | 375/260 |
| 6,084,906 A | * | 7/2000 | Kao et al. | 375/220 |
| 6,084,917 A | * | 7/2000 | Kao et al. | 375/260 |

FOREIGN PATENT DOCUMENTS

EP 1296494 A2 3/2003

OTHER PUBLICATIONS

Hidehiro Matsuoka, et al, "Adaptive Modulation System with Variable Coding Rate Concatenated Code for High Quality Multi-Media Communication System", IEEE 48th Mobile Technology for the Human Race, Vehicular Technology Conference, Apr. 28, 1996, pp. 487-491, vol. 1, IEEE, New York, NY, USA, XP010162435.

* cited by examiner

*Primary Examiner* — Dady Chery
(74) *Attorney, Agent, or Firm* — Baker & Hostetler LLP

(57) ABSTRACT

A method for optimizing the resources of a data transmission, based on a set of pairs of modulation and first correcting code, includes: determining, for each pair, maximum rate of a second correcting code applied to data transmitted before application of the first correcting code and of modulation wherein the error rate in data received is maximum a target error rate; the second correcting code applied at the medium access layer, to generate packets of redundancy bits based on packets of data bits received supplemented with padding sections, all having the same size; evaluating an item of information representative of the ratio between bits at input of the medium access layer and bits actually transmitted or of transmission bitrate required for solutions associating modulation, first and second correcting codes; selecting, from among solutions associating modulation, first and second correcting codes, to maximize the ratio or to minimize the transmission bitrate.

11 Claims, 4 Drawing Sheets

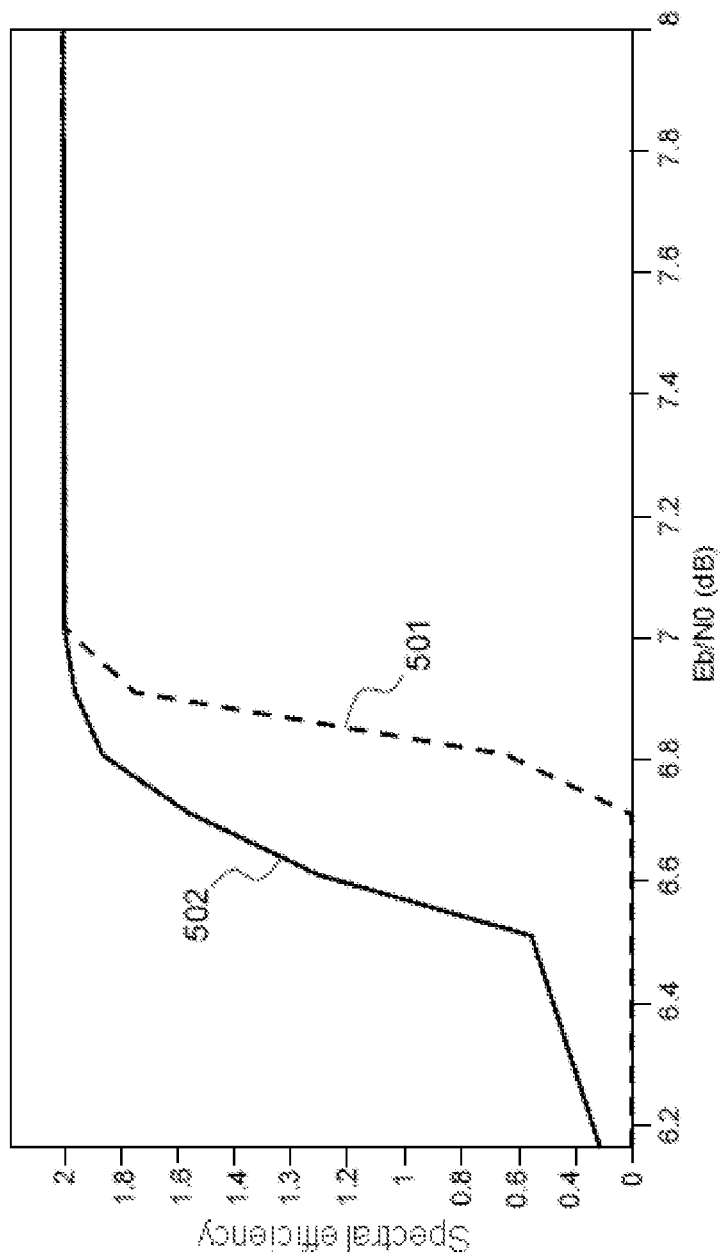

… (1)

METHOD FOR OPTIMIZING THE RESOURCES OF A DATA TRANSMISSION AT THE LEVEL OF THE MAC LAYER AND DEVICE IMPLEMENTING THE METHOD

CROSS-REFERENCE TO RELATED APPLICATION

This application claims priority to foreign French patent application No. FR 1202339, filed on Aug. 31, 2012, the disclosure of which is incorporated by reference in its entirety.

FIELD OF THE INVENTION

The field of the invention is that of wireless data transmission systems and in particular those for which the transmission channel is subjected to disturbances varying greatly over time.

The invention relates more particularly to the field of channel coding and the optimization of the resources of a data link by searching for an efficient compromise between consumed bitrate and robustness to the fluctuations of the transmission medium.

BACKGROUND

The general technical problem aimed at by the present invention is that of the adaptation of a data transmission to the fluctuations of the propagation channel. The so-called Adaptive Coding and Modulation technique, known by the acronym ACM, which consists in adapting the modulation, coding pair as a function of an item of information about the quality of the propagation channel, is known. This technique is notably used in the Wimax, UMTS, 3GPP/LTE or else DVB-S2 standards. The objective of this method is to determine the best modulation and coding parameters to guarantee a given level of quality of service while optimizing the useful bitrate offered by the system.

The implementation of the ACM method in a transmission system requires the management of several types of modulation and several rates of one and the same correcting code. In order for the bitrate/protection optimization to be as fine as possible and to allow efficient adaptation to the variations of the propagation channel, it is necessary in the absolute to benefit from a large possible number of modulation, coding pairs. Now, this necessity comes up against technological limits since it involves having significant resources in terms of memory space so as notably to store the various charts making it possible to deduce the probability of error associated with a modulation/coding pair as a function of the signal-to-noise ratio measured on the channel or of some other equivalent metric. Furthermore, too large a number of possible choices can also give rise to instability of the control loop which, on the basis of a measurement of the quality of the transmission link, carries out the adaptation of the modulation and coding parameters and thus cause lags in the processings carried out which may be penalizing in a real-time context.

The actual implementation of the ACM method is therefore generally performed by way of a limited number of modulation/coding pairs.

This significant granularity then presents a drawback for the performance of the system. Indeed, the application of the ACM method is aimed at determining the modulation/coding pair which makes it possible to comply with a given constraint of error rate at reception. However, the choice adopted to attain this objective causes a decrease in the useful bitrate and in the spectral efficiency on account of the redundancy added by the correcting code. The switchover from one modulation/coding pair to another may cause a large decrease in the useful bitrate and in the spectral efficiency, on account of the significant granularity.

This drawback is illustrated in FIG. 1 which represents the spectral efficiency as a function of the signal-to-noise ratio for four different modulation/coding pairs. Curve 10 corresponds to a QPSK modulation associated with a code of rate 1/3. Curve 20 corresponds to a QPSK modulation associated with a code of rate 1/2. Curve 30 corresponds to a QPSK modulation associated with a code of rate 2/3. Curve 40 corresponds to a QPSK modulation associated with a code of rate 3/4. Beyond a threshold value of signal-to-noise ratio, the spectral efficiency attains a plateau value. The maximum attainable spectral efficiency exhibits a difference of sometimes greater than 0.1 bit/sec/Hz, depending on the pairs chosen. The zones 50 of potential over-efficiency are identified on the curves. They correspond to cases where the protection added limits the useful bitrate too significantly with respect to the gain in robustness which is obtained.

SUMMARY OF THE INVENTION

The present invention proposes a solution making it possible to alleviate the aforementioned drawbacks of the so-called ACM methods.

The solution consists in applying upstream of the channel coding, at the level of the MAC layer, a second correcting code, preferably an erasure code of MDS (Maximum Distance Separable) type, for which the number of packets of redundancy bits generated is determined so as to guarantee a maximum error rate while limiting the decline in the useful bitrate and in the spectral efficiency, considered at the level of the MAC layer, with respect to an ACM solution alone.

Furthermore, the method according to the invention makes it possible to preserve a limited number of modulation/coding pairs while improving performance and without giving rise to instabilities at the level of the loop for adapting the parameters of the transmission as a function of the quality of the channel.

The subject of the invention is notably a method for optimizing the resources of a data transmission, characterized in that it consists, on the basis of a set of available pairs of modulation and first correcting code, in:

Determining, for each of the said pairs, the maximum rate of a second correcting code to be applied to the data to be transmitted before application of the first correcting code and of the modulation so that the error rate in the data received after transmission on an imperfect channel is at most equal to a target error rate, the said second correcting code being intended to be applied at the level of the medium access layer, so as to generate a plurality of packets of redundancy bits on the basis of a plurality of packets of data bits received supplemented with padding sections so that they all have the same size, evaluating (411) an item of information representative of the ratio between the number of bits at input of the medium access layer (MAC) and the number of bits actually transmitted or of the transmission bitrate required for the set of solutions associating modulation, first and second correcting codes, Selecting (412), from among the set of solutions associating modulation, first and second correcting codes, that which makes it possible to maximize the said ratio or to minimize the said transmission bitrate.

According to a particular aspect of the invention, the said second correcting code is a "Maximum Distance Separable" code whose maximum rate required for complying with the said target error rate is determined by:
  Determining the theoretical probability of error of the pair consisting of modulation, first correcting code associated with the transmission channel,
  Simulating the error rate of a transmission, on a channel modelled by the said theoretical probability, of data protected by the said second correcting code,
  Incrementing the number of packets of redundancy bits generated by the said second correcting code until the simulated error rate is less than the target error rate.

According to a particular aspect of the invention, the said item of information representative of the said ratio between the number of bits at input of the medium access layer (MAC) and the number of bits actually transmitted is calculated with the aid of the following relation: $E=1-(TEP_s \cdot K \cdot R)/(K+N_{PR})$, where $N_{PR}$ is the number of packets of redundancy bits generated to protect K data packets and R is the rate of the first correcting code that is multiplied by the number of bits per symbol of the modulation.

According to a particular aspect of the invention, the said second correcting code is a block code, for example a Reed Solomon code.

According to a particular aspect of the invention, the said error rates ($TEP_s$, $TEP_c$) are erroneous MAC packet rates and the pair consisting of modulation, first correcting code adopted is transmitted to the physical layer for application of the said first correcting code and of the said modulation to the data packets and to the redundancy packets provided by the medium access layer.

According to a particular aspect of the invention, the said K supplemented data packets are interleaved beforehand with the application of the second correcting code.

According to a particular aspect of the invention, the sizes of the said packets of redundancy bits are equal to one another and to the sizes of the said supplemented data packets.

The subject of the invention is also a data transmission system comprising means for implementing the method for optimizing the resources according to the invention. The said means can comprise at least one medium access layer, a physical layer and an item of information about the quality of the propagation channel.

The subject of the invention is also a computer program product comprising instructions for the execution of the method for optimizing the resources according to the invention when the program is executed by a processor.

BRIEF DESCRIPTION OF THE DRAWINGS

Other characteristics and advantages of the present invention will be more apparent on reading the description which follows in relation to the appended drawings which represent.

DETAILED DESCRIPTION

The method according to the invention consists in applying, to the packets received by the medium access layer (MAC layer), an erasure correcting code termed the MDS (Maximum Distance Separable) code. The main property of such a code is that if K is the number of information packets and N the total number of packets transmitted, including the information packets and the redundancy packets, any combination of K out of N packets makes it possible to recover the item of information contained in the K useful packets before application of the correcting code. The correcting code used may be a block code, for example a Reed Solomon code. The invention applies in an advantageous manner with an MDS code but also remains compatible with other types of correcting codes, for example an LDPC (Low Density Parity Check) code or any other correcting code making it possible to obtain the same property.

Figure 1:
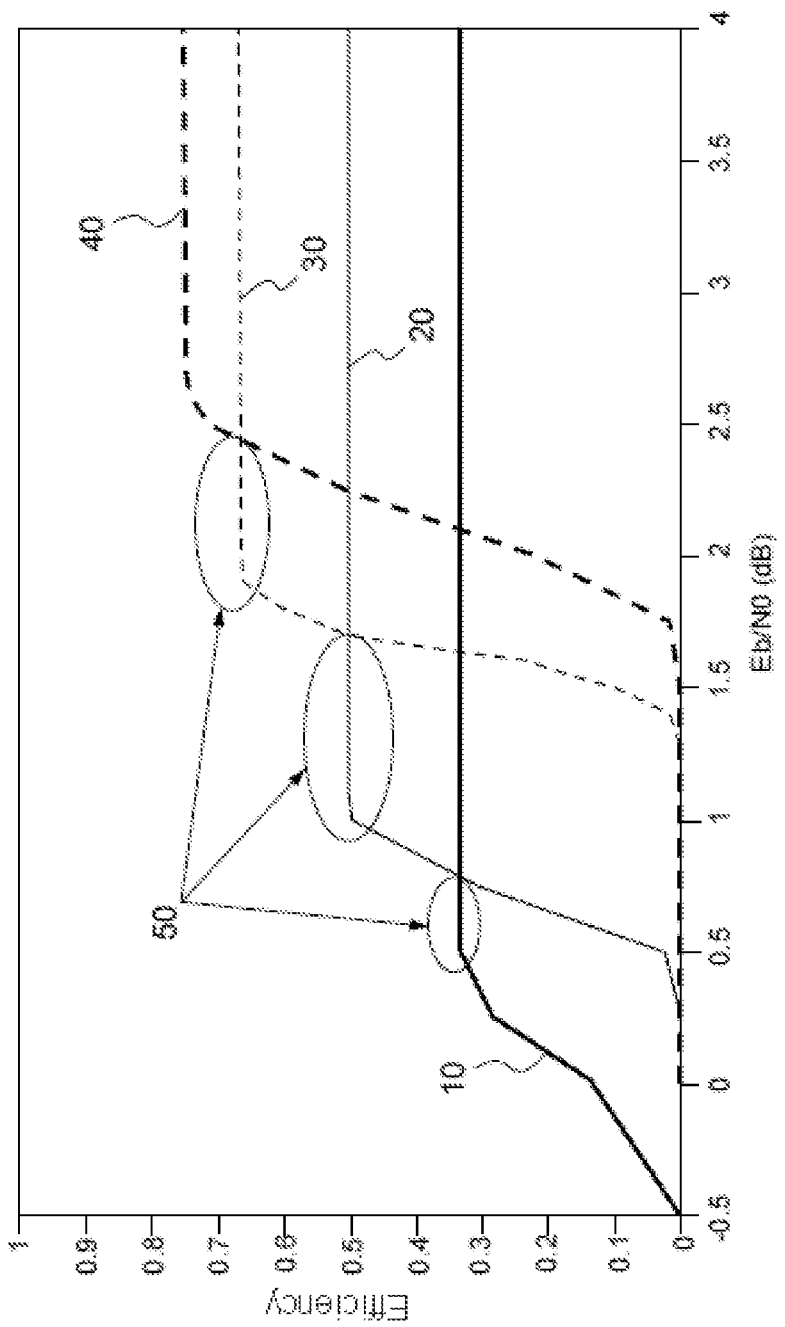
FIG. 1, a diagram representing the spectral efficiency as a function of the signal-to-noise ratio for various modulation and coding pairs,
  FIG. 2, a diagram of a data transmission system suitable for implementing the method according to the invention,
  FIG. 3, a diagram illustrating the application of a so-called "maximum separable distance" code to a plurality of packets received at the level of the medium access layer (MAC) of a transmission system,
  FIG. 4, a flowchart describing the method according to the invention making it possible to determine the optimal modulation, coding pair as well as the number of redundancy packets to be generated at the level of the MAC layer,
  FIG. 5, an example of curves of the resulting spectral efficiency as a function of the signal-to-noise ratio showing the processing gain obtained by application of the invention.
Figure 2:
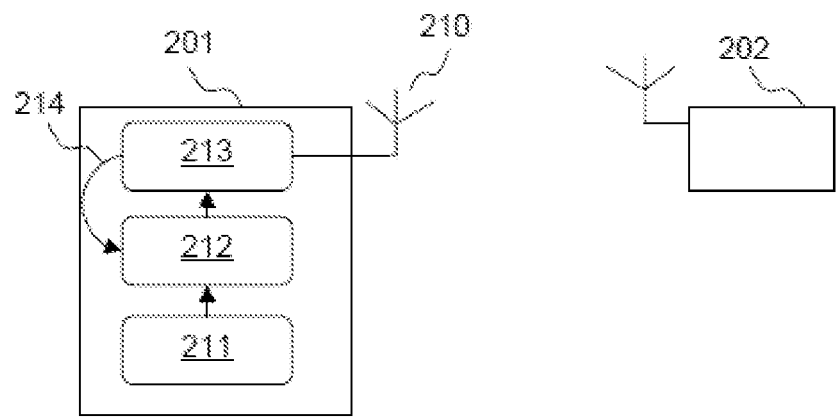

FIG. 2 shows diagrammatically a data transmission system for the implementation of the method according to the invention.

The invention can be implemented within a sender 201 comprising means 210, typically an antenna, for transmitting data via a wireless link towards a receiver 202.

The sender 201 is able to implement an adaptive modulation and coding method to transmit the data originating from an application 211 implemented in the sender 201 or in a separate entity. Such an application can be a transmission application for sending voice, image or video or else textual data. The data packets generated by the application 211 are transmitted to a medium access layer 212 or MAC layer and then to a physical layer 213 charged, notably, with shaping the data so as to transmit them on the physical channel. In particular, an appropriate modulation and an appropriate channel coding are applied at this level to the packets transmitted by the MAC layer. As a function of a measurement 214 of the quality of the transmission channel, the MAC layer selects the pair of parameters relating to the modulation and to the channel coding so as to obtain a required level of quality of service.

The method according to the invention is advantageously implemented at the level of the MAC layer 212 of the sender 201.

Figure 3:
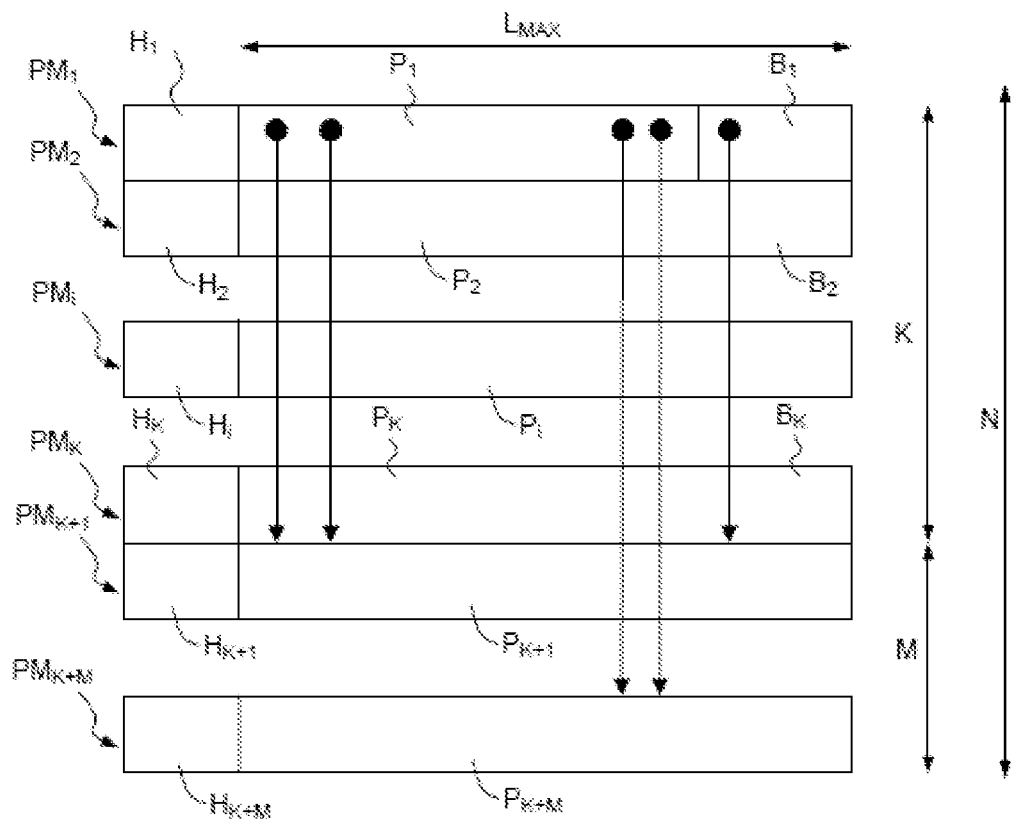

FIG. 3 illustrates an exemplary application of the MDS correcting code to a set of packets received by the MAC layer.

A number K of MAC packets $PM_1, PM_2, PM_i, PM_K$ is considered, each of which comprises a header $H_1, H_2, H_i, H_K$ and a payload $P_1, P_2, P_i, P_K$ originating from an application 211. The payloads are of variable size and the maximum size of a payload is denoted $L_{MAX}$. The MDS correcting code is applied in the following manner. Padding zones B1,B2,BK are concatenated after each payload so that all the resulting packets have the same size equal to $L_{MAX}$. These padding zones consist for example of bits all equal to 0 and are not transmitted to the physical layer; they serve solely for the coding operation implemented by the MAC layer.

The K resulting packets are stacked to constitute a matrix with K rows and $L_{MAX}$ columns and then the correcting code is applied column by column. For each column comprising K symbols (bits or bytes), a number M of redundancy symbols is thus generated. This operation is repeated for the set of columns and leads to the creation of M redundancy packets $P_{K+1}, P_{K+M}$ to which are added a MAC header $H_{K+1}, H_{K+M}$. The number M of redundancy packets is determined by applying the method according to the invention described hereinbelow. The N=K+M packets are thereafter transmitted to the physical layer with the item of information regarding the modulation/coding pair chosen.

Without departing from the scope of the invention, other applications of the MDS correcting code are conceivable as long as they make it possible to generate, on the basis of K useful data packets, M redundancy packets and as long as the N=M+K resulting packets are transmitted to the physical layer.

Described now is the method, according to the invention, making it possible to select the optimal modulation/coding pair to be applied at the level of the physical layer of the system as well as the number of redundancy packets, stated otherwise the rate of the MDS correcting code applied at the level of the MAC layer.

The objective sought is to determine the overall modulation and coding parameters which make it possible to obtain a rate of erroneous or lost packets that is below a target rate while minimizing the bitrate required for the transmission of the data stream obtained or else while maximizing the spectral efficiency calculated at the level of the MAC layer.

To reach this objective, the method according to the invention consists initially in determining, for each modulation/coding pair available for the physical layer, the minimum number of packets of additional redundancy bits that is required in order to attain the error rate target aimed at. This minimum number may optionally be zero if the rate of the channel coding of the physical layer is sufficient. Stated otherwise, this entails determining the rate of the erasure code to be applied at the level of the MAC layer, upstream of the physical channel coding and of the modulation.

Subsequently, the overall solution associating modulation and channel coding for the physical layer and MDS code for the MAC layer requiring the minimum transmission bitrate or making it possible to obtain the maximum spectral efficiency at the level of the MAC layer is adopted.

Figure 4:
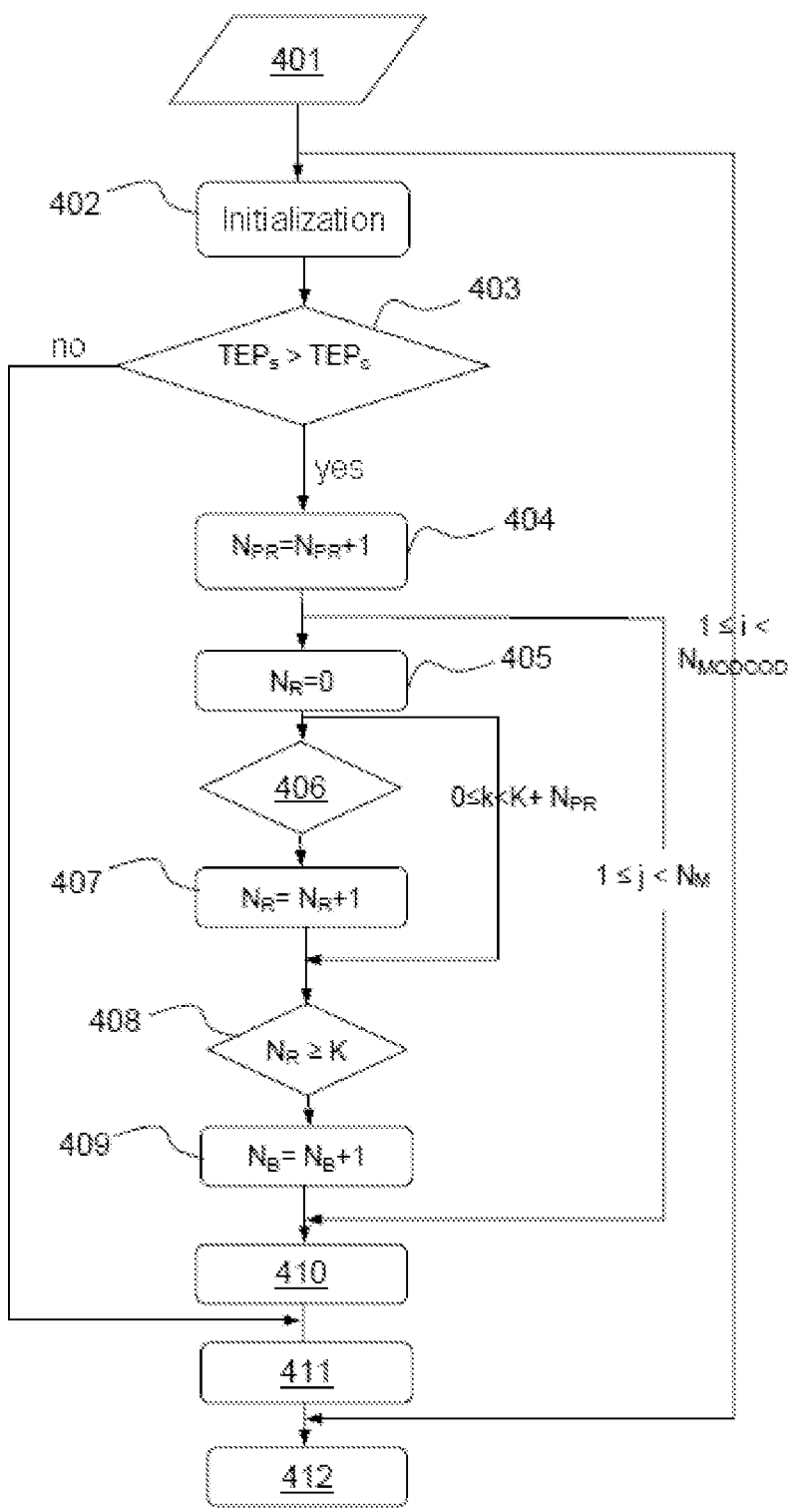

FIG. 4 describes, in a flowchart, an exemplary embodiment of the method according to the invention.

The implementation of the method requires the following input data 401: the number K of MAC packets to be protected by application of the MDS correcting code, the operating point in terms of signal-to-noise ratio aimed at, the target packet error rate $TEP_c$, the theoretical packet error rate probabilities associated with each of the modulation/coding pairs as well as the spectral efficiency of each pair. The spectral efficiency is defined as the rate of the correcting code applied at the level of the physical layer that is multiplied by the number of bits per symbol of the chosen modulation. For example, a QPSK modulation associated with a correcting code of rate 1/3 exhibits an overall rate equal to 2/3.

For each available modulation/coding solution, the set of the following steps are executed.

In an initialization step 402, the simulated packet error rate $TEP_s$ is initialized to 1, the number of packets of redundancy bits to be generated at the MAC level $N_{PR}$ is initialized to 0 and the number of correctly received bursts is initialized to 0. A burst consists of K+M packets.

A comparison 403 of the simulated packet error rate $TEP_s$ and of the target packet error rate $TEP_c$ is performed. As long as $TEP_s$ is strictly greater than $TEP_c$, the following steps are executed.

The number of packets of redundancy bits $N_{PR}$ is incremented 404.

The simulated packet error rate $TEP_s$ is thereafter calculated by repeating the following steps for a large number $N_M$ of transmitted packets, that is to say at least equal to 100 divided by the theoretical error probability.

The number $N_R$ of correctly received packets is initialized 405 to 0.

The impact of the propagation channel on the transmission of the N=K+M packets generated at the level of the MAC layer after application of the MDS correcting code is thereafter simulated. At this juncture, the number of packets of redundancy bits M is equal to $N_{PR}$.

For K+$N_{PR}$ packets, a test 406 is carried out by comparing the result of a Gaussian random draw with the theoretical error probability. If this test is positive, this signifies that the current packet is received and the number $N_R$ of correctly received packets is incremented 407. Once this test has been carried out for the K+$N_{PR}$ packets, it is verified 408 whether the number $N_R$ of correctly received packets is greater than or equal to K. If this is the case, the number $N_B$ of correctly received bursts is incremented 409.

When the loop over the number $N_M$ of transmitted packets is finished, the simulated error rate $TEP_s=1-N_B/N_M$ is calculated 410.

When the simulated error rate $TEP_s$ becomes less than the target error rate $TEP_c$, the spectral efficiency at the level of the MAC layer associated with the simulated solution is calculated 411 with the aid of the following formula:

$$E=1-(TEP_s \cdot K \cdot R)/(K+N_{PR}),$$

where R is the overall rate associated with the modulation/coding solution applied to the physical layer. The "spectral efficiency at the level of the MAC layer" expression calculated here takes into account the impact of the simulated error rate and is to be distinguished from the spectral efficiency calculated at the level of the physical layer which takes into account other parameters such as the power of the transmitted signal.

The spectral efficiency at the level of the MAC layer E can also be defined as the ratio between the number of bits to be transmitted at input of the MAC layer and the total number of bits transmitted at output of the physical layer.

When the spectral efficiency at the level of the MAC layer has been calculated for the set of solutions available for the physical layer, in a last step 412, the solution is adopted which exhibits the highest spectral efficiency E, for the operating point in terms of signal-to-noise ratio adopted.

In a variant embodiment of the invention, instead of the spectral efficiency at the level of the MAC layer, it is possible to evaluate the physical bitrate required to transmit the data stream encoded and modulated according to the solution adopted. The selection criterion then consists in adopting the solution which requires the lowest physical bitrate. This variant requires that the actual and maximum size of the MAC packets to be transmitted be taken into account.

The method described hereinabove is applied at the level of the MAC layer and makes it possible to determine the following three parameters: the modulation adopted, the correcting code adopted for the physical layer and the rate of the MDS correcting code to be applied at the level of the MAC layer. The first two parameters are transmitted to the physical layer and the third is used to encode the MAC packets in the manner described in FIG. 3.

The method according to the invention presents notably the advantage of not requiring any significant modification of the transmission equipment involved in managing the protocol stack since the redundancy bits generated by the second correcting code, the so-called MDS code, are provided directly in the form of whole MAC packets and do not therefore require complex management to place them into frames. In particular the proposed method does not require any additional fragmentation or concatenation.

Furthermore, it makes it possible to stabilize the loop for adapting the parameters of the transmission as a function of the quality of the channel, stated otherwise the channel coding and modulation parameters applied at the level of the physical layer.

It can be implemented on the basis of hardware and/or software elements. It can notably be implemented in the guise of a computer program comprising instructions for its execution. The computer program can be recorded on a recording medium readable by a processor.

FIG. 5 illustrates in a diagram giving the spectral efficiency as a function of the signal-to-noise ratio, the performance obtained by applying the method according to the invention. Curve 501 gives the spectral efficiency of the solution chosen by applying a conventional ACM method, here a QPSK modulation associated with a code of rate 2/3. Curve 502 gives the spectral efficiency obtained by applying the method according to the invention. It is seen that an appreciable gain is obtained. For identical signal-to-noise ratio, the spectral efficiency is increased. For identical spectral efficiency, the operating point in terms of signal-to-noise ratio is lowered.

The invention claimed is:

1. A method for optimizing resources of a data transmission, comprising:
   defining a set of available pairs of modulation and a first correcting code,
   determining, for each of said pairs, a maximum rate of a second correcting code to be applied to data to be transmitted before application of the first correcting code and of the modulation so that an error rate in data received after transmission on an imperfect channel is at most equal to a target error rate,
   said second correcting code being intended to be applied at a level of a medium access layer, so as to generate a plurality $N_{PR}$ of packets of redundancy bits on a basis of a plurality K of packets of data bits received supplemented with padding sections so that they all have the same size,
   evaluating an item of information representative of a ratio between a number of bits at input of the medium access layer and a number of bits actually transmitted or an item of information representative of a transmission bitrate required for a set of solutions associating modulation, first and second correcting codes, and
   selecting, from among the set of solutions associating modulation, first and second correcting codes, the one which makes it possible to maximize said ratio or to minimize said transmission bitrate.

2. The method for optimizing the resources of a data transmission according to claim 1, wherein said second correcting code is a "Maximum Distance Separable" code whose maximum rate required for complying with said target error rate is determined by:
   determining a theoretical probability of error of the pair consisting of modulation, first correcting code associated with the transmission channel,
   simulating the error rate of a transmission, on a channel modelled by said theoretical probability, of data protected by said second correcting code,
   incrementing a number of packets of redundancy bits generated by said second correcting code until a simulated error rate is less than the target error rate.

3. The method for optimizing the resources of a data transmission according to claim 2, wherein said item of information representative of said ratio between the number of bits at input of the medium access layer and the number of bits actually transmitted is evaluated with the aid of the following relation: $E=1-(TEP_s \cdot K \cdot R)/(K+N_{PR})$, where $N_{PR}$ is the number of packets of redundancy bits generated to protect K data packets and R is the rate of the first correcting code that is multiplied by the number of bits per symbol of the modulation.

4. The method for optimizing the resources of a data transmission according to claim 2, wherein said second correcting code is a block code.

5. The method for optimizing the resources of a data transmission according to claim 2, wherein said second correcting code is a block code comprising a Reed Solomon code.

6. The method for optimizing the resources of a data transmission according to claim 1, wherein:
   said error rates are erroneous MAC packet rates,
   the pair consisting of modulation, first correcting code adopted is transmitted to the physical layer for application of said first correcting code and of said modulation to the data packets and to the redundancy packets provided by the medium access layer.

7. The method for optimizing the resources of a data transmission according to claim 6, in which said K supplemented data packets are interleaved beforehand with the application of the second correcting code.

8. The method for optimizing the resources of a data transmission according to claim 7, in which the sizes of said packets of redundancy bits are equal to one another and to the sizes of said supplemented data packets.

9. A data transmission system for optimizing resources of a data transmission, comprising:
   defining a set of available pairs of modulation and a first correcting code,
   a transmission device configured to determine, for each of said pairs, a maximum rate of a second correcting code to be applied to a data to be transmitted before application of the first correcting code and of the modulation so that an error rate in data received after transmission on an imperfect channel is at most equal to a target error rate,
   said second correcting code being intended to be applied at a level of a medium access layer, so as to generate a plurality $N_{PR}$ of packets of redundancy bits on a basis of a plurality K of packets of data bits received supplemented with padding sections so that they all have the same size,
   the transmission device further configured to evaluate an item of information representative of a ratio between a number of bits at input of the medium access layer and a number of bits actually transmitted or an item of information representative of a transmission bitrate required for a set of solutions associating modulation, first and second correcting codes, and
   the transmission device further configured to select, from among the set of solutions associating modulation, first and second correcting codes, the one which makes it possible to maximize said ratio or to minimize said transmission bitrate.

10. The data transmission system according to claim 9, wherein said transmission device is configured to be implemented with at least one medium access layer, a physical layer and an item of information about the quality of a propagation channel.

11. A Computer program product comprising instructions stored on a tangible non-transitory storage medium for execution by a processor of a method for optimizing the resources of a data transmission, comprising:

defining a set of available pairs of modulation and a first correcting code, determining, for each of said pairs, a maximum rate of a second correcting code to be applied to data to be transmitted before application of the first correcting code and of the modulation so that an error rate in the data received after transmission on an imperfect channel is at most equal to a target error rate, said second correcting code being intended to be applied at a level of a medium access layer, so as to generate a plurality NPR of packets of redundancy bits on a basis of a plurality K of packets of data bits received supplemented with padding sections so that they all have the same size, evaluating an item of information representative of a ratio between a number of bits at input of the medium access layer and a number of bits actually transmitted or an item of information representative of a transmission bitrate required for a set of solutions associating modulation, first and second correcting codes, and selecting, from among the set of solutions associating modulation, first and second correcting codes, the one which makes it possible to maximize the said ratio or to minimize the said transmission bitrate.

* * * * *